2,999,047
BACTERICIDAL COMPOSITION

Ernst Model, Basel, and Jakob Bindler and Robert Zinkernagel, Riehen, near Basel, Switzerland, assignors to J. R. Geigy A.-G., Basel, Switzerland
No Drawing. Filed Aug. 24, 1959, Ser. No. 835,420
Claims priority, application Switzerland Sept. 8, 1958
5 Claims. (Cl. 167—33)

The present invention concerns a bactericidal composition, a process for the protection of organic materials of all types against micro-organisms by using same as well as the material protected by this process.

Compositions of matter according to the invention contain a combination of active substances consisting of at least one bactericidal active ingredient from the class of compounds of the general Formula I and at least one bactericidal active substance from the class of compounds of the general Formula II

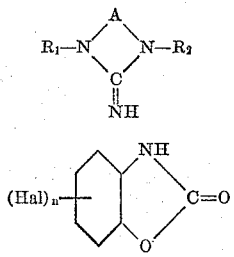

In these formulae $R_1$ represents a lipophilic group having 10–14 C atoms or an araliphatic radical containing a lipophilic group,
$R_2$ represents hydrogen or a low aliphatic group,
A represents an aliphatic radical bound by $\alpha.\beta$- or $\alpha.\gamma$-carbon atoms or a cycloaliphatic radical bound by $\alpha.\beta$-carbon atoms,
Hal represents a halogen atom, and
$n$ is 0, 1, 2, 3 or 4.

For example $R_1$ represents the decyl, dodecyl, tetradecyl group or the 4-dodecylbenzyl group. Compounds of the general Formula I in which $R_1$ is the dodecyl or tetradecyl group are preferred.

$R_2$ represents, for example, the methyl, ethyl, n-propyl, isopropyl, or the n-butyl group; compounds of the general Formula I are preferred however, in which $R_2$ is hydrogen.

Examples of alkylene radicals A bound at $\alpha.\beta$-carbon atoms which complete the hetero ring into an imidazolidine compound are 1.2-ethylene, 1.2-propylene, 1.2- or 2.3-butylene radicals and examples of analogously bound cycloalkylene radicals are the 1.2-cyclohexylene radical or the 3- or 4-methyl-1.2-cyclohexylene radicals. As examples of alkylene radicals A bound at $\alpha.\gamma$-carbon atoms which complete the hetero ring into a hexahydropyrimidine compound can be named the 1.3-propylene, 1.3-butylene, 1.3- or 2.4-pentylene radicals. Those compounds of the general Formula I are preferred in which A is the 1.2-ethylene radical.

In the general Formula II, Hal advantageously represents chlorine or bromine. With regard to the fungicidal action, those compositions of matter have been found to be best in which 5.6-dichloro-2.3-dihydrobenzoxazole-2-one or 4.5.7-trichloro-2.3-dihydrobenzoxazole-2-one are contained as active ingredients of the Formula II.

The active ingredients of the Formula I can be used as such as in the form of their salts with acids, for example as hydrochlorides or hydrobromides, possibly also with the addition of acetic acid.

The quantivalent ratio of active ingredient of the Formula I to active ingredient of the Formula II is advantageously from 1:1 to 4:1.

The fungicidal action of 2.3-dihydrobenzoxazole-2-one (see Virtanen, Acta Chemica Scandinavica, 12 (1958), 124–128, No. 1) is known. Also the fungicidal and bactericidal action of certain dialkylated 2-imino-1.3-di-N-heterocycles is known.

The compositions of active substance according to the invention, however, particularly in the quantivalent ratios given above, have a fungicidal activity superior to the sum of the fungicidal activities of the individual components. Because of this synergistic effect, a given purpose is attained with considerably smaller concentration of the composition of active substances in a carrier than is attained on using the individual components.

The bactericidal and algaecidal properties of the 2-imino-1.3-di-N-heterocycles defined remain unchanged in the composition of active substances according to the invention.

Here and below, the words "fungicidal" or "bactericidal" activity are used even when perhaps only "fungistatic" or "bacteriostatic" activity are meant.

Another valuable property of the compositions of active substances according to the invention is their good water solubility or dispersibility. This is surprising because the 2.3-di-hydrobenzoxazole-2-one used according to the invention is difficultly soluble in water alone.

A great advantage of the compositions of active substances according to the invention is that they can be used as aqueous or as organic-aqueous solutions. Organic solvents which are miscible with water are chiefly used, for example ethanol or ethylene glycol monomethyl or monoethyl ether. The aqueous or aqueous-organic solutions of active substances according to the invention can easily be applied to organic materials, chiefly to textiles, for example, to textiles made up from wool, silk, cotton or acetyl cellulose or from polyamide, polyacrylonitrile or polyester fibres. On fibres which are not themselves subject to attack by microbes, they serve as a protection against possible finishings and plasticisers.

The best effect is attained by impregnations with such compositions of active substances which contain the active ingredients defined above in quantivalent ratio of 2:1 or 3:1. The concentration of composition of active substance in solution is advantageously at least 0.5 per mille. Water is the preferred solvent.

Impregnation of these materials with compositions of matter according to the invention affords protection against, for example, *Fusarium oxysporum, Aspergillus niger, Ctenomyces interdigitalis, Penicillium expansum, Stachybotris atra, Chaetonium globosum*, as well as against certain bacteria and algae.

The combinations of active substances according to the invention can be used not only in the form of their aqueous or aqueous-organic solutions but also mixed with other inert carriers or fillers, for example with cleansing agents, cosmetics or medical preparations, with other biocidal or insecticidal agents etc., thus in pulverulent form, as solutions or as dispersions.

As they are soluble not only in alcohols but also in other organic solvents such as, e.g. in aliphatic or aromatic chlorinated or unchlorinated hydrocarbons such as benzene, toluene, chlorobenzene or dichlorethylene, they are suitable for use in dry cleaning agents as well as for the production of so-called "sprays" for the disinfection of enclosed spaces. (In this case, component I is used advantageously in the form of its free base.) In addition they can also be mixed into paper treatment liquors or printing thickeners made from starch or cellulose derivatives or they can be used for the impregnation of wood, The combination of active substances according to the invention also provide effective protection against attack by fungi in polyvinyl chloride preparation, for example, foils, as well as in lacquers and emulsion paints which are based on casein or contain casein as well as in inorganic materials such as, for example, white-wash powders.

In addition, the compositions of matter according to the invention can also successfully protect the feet from attack by fungi, for example, by treating shoes, inner soles or hosiery to eliminate infection centres or as prophylaxis. The bactericidal and algaecidal activity of the compositions of matter according to the invention covers, for example, Staphylococci, Coli, Paratyphus and Enteritis bacilli.

The manifold properties of the new fungicidal and bactericidal agents enable the form of application to be adapted each time to the conditions. For example, for the treatment of wounds, ointments, powders and bandages containing these combinations of active substances as well as washing liquors in the form of aqueous or aqueous-alcoholic solutions of these agents can be used. The agents according to the invention are also suitable for the disinfection of instruments, apparatus and equipment. Finally, mention should be made of their use in cosmetics.

The following tables illustrate the synergistic action of the combinations of active substances according to the invention. The figures give the marginal concentration which is still active in p.p.m.

TABLE I

Action of the components against micro-organisms

| No. | Substances | Action against— | |
|---|---|---|---|
| | | Fusarium oxysporum | Aspergillus niger |
| 1 | 4,5-dichloro benzoxazolone (Cl, Cl, C=O, NH) | 300 | 300 |
| 2 | trichloro benzoxazolone | 100 | 300 |
| 3 | $C_{12}H_{25}$—N(CH$_2$—CH$_2$)NH / C=NH·HCl | 300 | 1,000 |
| 4 | $C_{12}H_{25}$—N(CH$_2$—CH$_2$)NC$_4$H$_9$ / C=NH·HCl | 300 | 1,000 |
| 5 | $C_{14}H_{29}$—N(CH$_2$—CH$_2$)NH / C=NH·HCl | 1,000 | 1,000 |

TABLE 2

Action of mixtures of active substances according to the invention in quantivalent ratio of 2:1 on the same micro-organisms:

| Mixture of the numbers from Table 1 | Action against— | |
|---|---|---|
| | Fusarium oxysporum | Aspergillus niger |
| 3+1 | 30 | 100 |
| 3+2 | 30 | 30 |
| 4+1 | 100 | 300 |
| 5+1 | 100 | 100 |
| 4+2 | 30 | 100 |
| 5+2 | 30 | 30 |

The following examples illustrate the invention without limiting it in any way. Where not otherwise stated, in the examples parts are given as parts by weight. The temperatures are given in degrees centigrade. The relationship of parts by weight to parts by volume is as that of kilogrammes to litres. By "active substance" the combination of active ingredients as defined is meant.

EXAMPLE 1

30 parts of 1-dodecyl-2-imino-imidazolidine hydrochloride and 15 parts of 5.6-dichloro-2.3-dihydrobenzoxazole-2-one are dissolved in 55 parts of ethylene glycol monomethyl ether and, from this stock solution, a dilution is made with hot water to give a treatment bath which contains 1 part of active substance per 1000 parts. The pH of the solution is brought to 4.5 with acetic acid. Calico is treated in this liquor (liquor ratio 1:20) for 20 minutes at 60°. The material is then wrung out and dried. The material so treated is protected against mildew spots and rot, as can be seen from Table 3. The material was tested as follows:

(a) *For mould spots.*—Rounds of material of 9 cm. diameter are laid in Petri dishes on an agar nutrient medium and infected with a suspension of a spore mixture of *Penicillium expansum, Stachybotrys atra* and *Aspergillus niger* which contains 40,000 spores per cubic centimetre. The closed Petri dishes are kept for 10 days at 28° and then the number of fungus colonies is counted.

(b) *For rot.*—Rounds of material of 3.8 cm. diameter are laid in Petri dishes on an agar nutrient medium which is infected with 0.5 cm.$^3$ of a spore suspension of *Chaetomium globosum* containing about 700,000 spores per cubic centimetre. The Petri dishes are kept for 10 days at 28°, the development of the spores is interrupted with an alcoholic thymol solution and the rounds of material are rinsed and dried. The material is then tested in the spot tester according to R. Burgess (Microorganismus and Textiles: The Journal of Applied Bacteriology, 17, 241 (1954) to see if the strength of the material has been reduced.

(c) *Soil burial test.*—Rounds of material of 3.8 cm. diameter are buried for 14 days in an earth mixture of a mositure content of 30% and a temperature of 28° prepared from 50% compost, 30% cow dung and 20% sand. The material is then rinsed and dried and then tested in the spot tester according to Burgess.

In the rot and soil burial test the value given is the average of 10 tests. The strength is given in percent of that of the original material. The results of these tests are summarised in the table.

EXAMPLE 2

60 parts of 1-tetradecyl-2-imino-imidazolidine hydrochloride and 30 parts of 4.5.7-trichloro-2.3-dihydrobenzoxazole-2-one are dissolved in 110 parts of ethylene glycol monoethyl ether and a treatment liquor is made therefrom by dilution with hot water which contains 1 part of active substance per 1000 parts.

Calico is treated with this liquor as described in Example 1. The impregnated material is protected against mildew spots and rot as can be seen from Table 3. The tests were made as described in Example 1.

If instead of the 30 parts of 4.5.6-trichloro-2.3-dihydrobenzoxyazole-2-one, 30 parts of 5-chloro-6-bromo-2.3-dihydrobenzoxazole-2-one are used and otherwise the same procedure is followed, similarly good results are obtained.

EXAMPLE 3

30 parts of 1-dodecyl-3-butyl-2-imino-imidazolidine hydrochloride and 15 parts of 4.5.7-trichloro-2.3-dihydrobenzoxazole-2-one are dissolved in 55 parts of ethylene glycol monomethyl ether. This solution is diluted with boiling water so that a treatment liquor is obtained which contains 0.5 part of active substance per 1000 parts. Calico is treated therewith as described in Example 1. The impregnated material is protected against mildew spots and rot. It was tested for mildew spots, rot and earth burial as described in Example 1. The results are given in Table 3.

If, in the above example, instead of 30 parts of 1-dodecyl-3-butyl-2-imino-imidazolidine hydrochloride, 30 parts of 1-dodecyl-3-methyl- or -ethyl- 2-imino-imidazolidine hydrochloride are used or, instead of 15 parts of 4.5.7-trichloro-2.3-dihydrobenzoxazole-2-one, 15 parts of 6-bromo-2.3-dihydrobenzoxazole-2-one are used and otherwise the same procedure is followed, then similarly good results are obtained.

EXAMPLE 4

30 parts of 1-dodecyl-2-imino-imidazolidine hydrochloride and 15 parts of 2.3-dihydrobenzoxazole-2-one are dissolved in 55 parts of ethyl alcohol. A treatment liquor is made from this stock solution by the addition of water which contains 1 part of active substance per 1000 parts. Calico is treated with this liquor as described in Example 1. The material treated is protected against mildew spots and rot. The results of the tests can be seen from Table 3.

If instead of the above stock solution, one is used which contains 25 parts of 1-dodecyl-2-imino-imidazolidine hydrobromide and 25 parts of 2.3-dihydrobenzoxazole-2-one dissolved in 50 parts of isopropyl alcohol, and otherwise the same procedure is followed, then similarly good results are obtained.

EXAMPLE 5

30 parts of 1-tetradecyl-2-imino-imidazolidine hydrochloride and 15 parts of 5.6-dichloro-2.3-dihydrobenzoxazole-2-one are dissolved in 55 parts of ethylene glycol monomethyl ether and this stock solution is diluted with hot water to obtain a treatment liquor which contains 0.5 part of active substance per 1000 parts. Calico is treated in this solution as described in Example 1. The treated material is protected against mildew spots and rot. It was tested for mildew spots, rot and earth burial as described in Example 1. The results can be seen from Table 3.

If instead of the 30 parts of 1-tetradecyl-2-imino-imidazolidine hydrochloride, 30 parts of 1-dodecyl-2-imino-hexahydro pyrimidine hydrochloride or of 1-tetradecyl-2-imino-hexahydro pyrimidine hydrochloride are used and otherwise the same procedure is followed, then similarly good results are obtained.

EXAMPLE 6

30 parts of 1-dodecyl-2-imino-imidazolidine hydrochloride and 15 parts of 5-chloro-2.3-dihydrobenzoxazole-2-one are dissolved in 55 parts of ethylene glycol monomethyl ether. On diluting this stock solution with hot water, a treatment liquor is obtained which contains 2 g. of active substance per litre. Calico is treated with this liquor as described in Example 1. The treated material is protected against mildew spots and rot, as can be seen frm Table 3. The tests were made as fully described in Example 1.

If instead of the stock solution described above, 40 parts of 1-dodecyl-2-imino-imidazolidine hydrochloride and 10 parts of 5.6-dichloro-2.3-dihydrobenzoxazole-2-one dissolved in 50 parts of ethylene glycol monomethyl ether are used or 40 parts of 1-decyl-2-imino-imidazolidine hydrochloride or of 1-decyl-2-imino-hexahydro pyrimidine hydrochloride and 10 parts of 5.6-dichloro-2.3-dihydrobenzoxazole-2-one dissolved in 50 parts of ethylene glycol monoethyl ether are used, and the procedure described above is followed, then similarly good results are obtained.

EXAMPLE 7

30 parts of 1-dodecyl-2-imino-imidazolidine hydrochloride and 15 parts of 4.5.7-trichloro-2.3-dihydrobenzoxazole-2-one are dissolved in 55 parts of ethylene glycol monoethyl ether and a treatment liquor is made therefrom by dilution with hot water which liquor contains 0.5 part of active substance per 1000 parts.

Calico is treated with this liquor as described in Example 1. The treated material is protected against mildew spots and rot. The results can be seen from Table 3.

If instead of the stock solution described above, one is used which contains 30 parts of 1-(4'-dodecylbenzyl)-2-imino-imidazolidine hydrochloride or of 1-(4'-dodecylbenzyl)-2-imino-hexahydro pyrimidine hydrochloride and 15 parts of 5.6-dichloro-2.3-dihydrobenzoxazole-2-one dissolved in 55 parts of ethylene glycol monomethyl ether and the procedure described above is followed, then similarly good results are obtained.

EXAMPLE 8

30 parts of 1-dodecyl-2-imino-4.5-tetramethylene imidazolidine hydrochloride and 15 parts of 5.6-dichloro-2.3-dihydrobenzoxazole-2-one are dissolved in 55 parts of ethylene glycol monomethyl ether and a treatment liquor is made from this stock solution by dilution with hot water which liquor contains 1 part of active substance per 1000 parts.

Calico is treated with this liquor as described in Example 1. The treated material is protected against mildew spots and rot. It is tested for mildew spots, rot and earth burial as described in Example 1. The results can be seen from Table 3.

EXAMPLE 9

20 parts of 1-dodecyl-2-imino-imidazolidine hydrochloride and 10 parts of 4.5.6.7-tetrachloro-2.3-dihydrobenzoxazole-2-one are dissolved in 45 parts of ethylene glycol monomethyl ether and on diluting this stock solution with cold water, a treatment liquor is obtained which contains 2 parts of active substance per 1000 parts. Calico is dipped in this treatment liquor at 25° for 10 seconds, squeezed out until the increase in weight is 77% of that of the original and then dried cold. The material so treated is protected against mildew spots and rot. It is tested for mildew spots, rot and earth burial as described in Example 1. The results can be seen in Table 3.

EXAMPLE 10

A spray is produced consisting of 2 parts of 5.6-dichloro-2.3-dihydrobenzoxazole-2-one, 2 parts of 1-dodecyl-2-imino-imidazolidine hydrochloride, 5 parts of diotcyl phthalate, 25 parts of ethylene glycol monoethyl ether and 66 parts of a mixture consisting chiefly of aliphatic hydrocarbons, which mixture has a boiling range of 150–180°. A piece of wool muslin, the weight per square metre of which is about 85 g., is sprayed in such a manner that 20 g. of spray are applied to each square metre. The wool muslin is then hung to dry in the air. The material so treated is tested for mildew spot as described in Example 1. There is no development of fungus colonies.

If instead of wool muslin, calico is treated as described above, no fungus colonies are formed.

TABLE 3

Results of tests in the examples

| Example | content of liquor, g./litre | mildew spot test, number of fungus colonies | | | rot test strength, percent | earth burial test strength, percent |
|---|---|---|---|---|---|---|
| | | Penicillium expansum | Stachybotrys atra | Aspergillus niger | | |
| 1 | 1 | 0 | 0 | 0 | 91 | 100 |
| 2 | 1 | 0 | 0 | 0 | 100 | 90 |
| 3 | 0.5 | 0 | 0 | 0 | 93 | 99 |
| 4 | 1 | 0 | 0 | 0 | 88 | 100 |
| 5 | 0.5 | 0 | 0 | 0 | 90 | 92 |
| 6 | 2 | 0 | 0 | 0 | 100 | 100 |
| 7 | 0.5 | 0 | 0 | 0 | 89 | 90 |
| 8 | 1 | 0 | 0 | 0 | 98 | 89 |
| 9 | 2 | 0 | 0 | 0 | 97 | 98 |
| blind test | 0 | ∞ | ∞ | ∞ | 0 | 0 |

What we claim is:

1. A biocidal composition of matter comprising the following active ingredients in the specified proportions by weight: 1 to 3 parts of a compound of the general formula

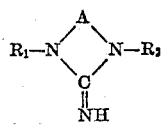

I wherein A represents a bivalent saturated hydrocarbon radical which completes the heterocyclic nucleus selected from the group consisting of the imidazolidine and hexahydropyrimidine series, $R_1$ represents a $C_{10}$ to $C_{14}$ alkyl radical and $R_2$ represents a member selected from the group consisting of hydrogen, and lower alkyl radicals, and 1 part of a compound of the general formula

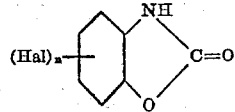

II wherein Hal represents a member selected from the group consisting of chlorine and bromine, and $n$ is an integer from 0 to 4 inclusive.

2. A biocidal composition of matter comprising two parts by weight of 1-dodecyl-2-imino-imidazolidine and 1 part by weight of 5.6-dichloro-2.3-dihydrobenzoxazole-2-one.

3. A biocidal composition of matter comprising two parts by weight of 1-tetradecyl-2-imino-imidazoline and 1 part by weight of 4.5.7-trichloro-2.3-dihydrobenzoxazole-2-one.

4. A biocidal composition of matter comprising two parts by weight of 1-tetradecyl-2-imino-imidazolidine and 1 part by weight of 5.6-dichloro-2.3-dihydrobenzoxazole-2-one.

5. A biocidal composition of matter comprising two parts by weight of 1-dodecyl-2-imino-imidazolidine and 1 part by weight of 4.5.7-trichloro-2.3-dihydrobenzoxazole-2-one.

References Cited in the file of this patent

UNITED STATES PATENTS

| 2,689,249 | Benneville et al. | Sept. 14, 1954 |

FOREIGN PATENTS

| 90,791 | Norway | Jan. 20, 1958 |
| 1,156,972 | France | May 23, 1958 |